(12) United States Patent
Kuhlmann et al.

(10) Patent No.: US 7,015,654 B1
(45) Date of Patent: Mar. 21, 2006

(54) LIGHT EMITTING DIODE DRIVER CIRCUIT AND METHOD

(75) Inventors: Kurt A. Kuhlmann, San Jose, CA (US); David M. Allen, Blachly, OR (US)

(73) Assignee: Laughing Rabbit, Inc., Blachly, OR (US)

(*) Notice: Subject to any disclaimer, the term of this patent is extended or adjusted under 35 U.S.C. 154(b) by 162 days.

(21) Appl. No.: 10/254,450

(22) Filed: Sep. 24, 2002

Related U.S. Application Data (60) Provisional application No. 60/331,941, filed on Nov. 16, 2001.

(51) Int. Cl.
*H03K 3/42* (2006.01)

(52) U.S. Cl. .................. 315/291; 323/222; 327/514
(58) Field of Classification Search .............. 315/224, 315/225, 291, 307, 209 R; 327/175, 514, 327/515, 540; 323/222, 265, 299
See application file for complete search history.

(56) References Cited

U.S. PATENT DOCUMENTS

| | | | |
|---|---|---|---|
| 3,330,949 A | 7/1967 | Bush | 240/6.45 |
| 4,242,724 A | 12/1980 | Stone | 362/158 |
| 4,408,261 A | 10/1983 | Polakoff | 362/104 |
| 4,774,643 A | 9/1988 | McGinnis et al. | 362/189 |
| 4,831,504 A | 5/1989 | Nishizawa et al. | 362/100 |
| 4,837,559 A | 6/1989 | Green, Sr. | 340/573 |
| D321,785 S | 11/1991 | Garrity | D3/63 |
| 5,070,437 A | 12/1991 | Roberts, Sr. | 362/158 |
| 5,134,558 A | 7/1992 | Williams et al. | 362/263 |
| 5,143,439 A | 9/1992 | Lewis et al. | 362/103 |
| 5,201,578 A | 4/1993 | Westmoland | 362/104 |
| 5,319,531 A | 6/1994 | Kutnyak | 362/184 |
| 5,386,351 A | 1/1995 | Tabor | 362/201 |
| D367,087 S | 2/1996 | Mathews | D21/109 |
| D375,372 S | 11/1996 | Allen | D26/37 |
| D380,566 S | 7/1997 | Chen | D26/37 |
| 5,927,842 A | 7/1999 | Preisler | 362/103 |
| 5,927,846 A | 7/1999 | Sinclair | 362/189 |
| 5,980,062 A | 11/1999 | Bell | 362/184 |
| 6,015,217 A | 1/2000 | Colangelo et al. | 362/103 |
| 6,016,038 A | 1/2000 | Mueller et al. | 315/291 |
| 6,022,127 A | 2/2000 | Krietzman | 362/259 |
| 6,070,990 A | 6/2000 | Dalton et al. | 362/201 |
| 6,095,661 A | 8/2000 | Lebens et al. | 362/184 |
| 6,135,605 A | 10/2000 | Hsu et al. | 362/102 |
| 6,249,089 B1 | 6/2001 | Bruwer | 315/200 A |
| 6,305,818 B1 * | 10/2001 | Lebens et al. | 362/800 |
| 6,320,330 B1 * | 11/2001 | Haavisto et al. | 315/291 |

* cited by examiner

*Primary Examiner*—Wilson Lee
(74) *Attorney, Agent, or Firm*—Black Lowe & Graham PLLC

(57) ABSTRACT

A mirco-controller and boost converter circuit provide constant current to light emitting diode array. A micro-controller operatively coupled with a semiconductor switch and the boost converter circuit measure the ability of a DC power supply to change the inductor. Duty cycles of the semiconductor switch are modified according to the measurement so as to supply substantially constant current to the LED array through an inductor regardless of actual battery voltage.

16 Claims, 8 Drawing Sheets

LIGHT EMITTING DIODE DRIVER CIRCUIT AND METHOD

CROSS-REFERENCE TO RELATED APPLICATION

This application claims priority from co-pending, U.S. Provisional Application No. 60/331,941 titled CONVERTIBLE FLASHLIGHT-HEADLAMP filed on Nov. 16, 2001.

BACKGROUND OF THE INVENTION

1. Field of the Invention

The invention generally relates to portable illumination devices. More specifically, the invention relates to personal, handheld flashlights having a self-contained direct current power supply and one or more light emitting diodes as a light source.

2. Description of the Related Art

Technology relating to handheld flashlights incorporating a direct current power supply in the form of replaceable batteries and low voltage, incandescent bulbs achieved a technological plateau in the 1970's. Advances in the state of the art typically related to methods of packaging the batteries and bulbs, and reflector designs. In particular, the capabilities of flashlights of this type are strictly limited by inherent characteristics of the incandescent bulb itself. Initially, evacuated bulbs using tungsten filaments enabled power supplies in the range of 1.3V (and more when such batteries are connected in series) to provide varying levels of illumination. So-called halogen bulbs permitted higher filament temperatures increasing the output of such flashlights. Nevertheless, the inherent inefficiency of incandescent bulbs limited the duration of operation of such flashlights to a matter of a few hours or less depending on the number of dry cells provided in the power supply. That is, for increased run time the batteries could be connected in parallel. For increased light intensity the batteries could be connected in series (for increased voltage) but at the expense of run time. In addition, filament bulbs are highly susceptible to mechanical shock, breaking the filament and rendering the flashlight inoperative. In addition, substantial development effort was directed to switch mechanisms for intermittently connecting the direct current power supply to the incandescent bulb so as to render either a more reliable or inexpensive switch, or both.

U.S. Pat. No. 4,242,724 to Stone is believed to be representative of one evolutionary branch of such technology relating to the packaging of a disposable floating flashlight in which the outer casing of the light itself forms a part of the switch mechanism which, when squeezed, completes electrical continuity between two AA (1.3V each) batteries and an incandescent bulb. The flashlight is compact, and floats if accidentally dropped into water. U.S. Pat. No. 5,134,558 to Williams et al. discloses a different evolutionary branch in which the light output from four AA-type batteries is boosted by an oscillator driven transformer rectifying circuit to an intermittent high voltage applied to a xenon gas flashtube so as to provide a high intensity emergency flasher. The device disclosed in Williams et al. delivers significantly more illumination from a direct current power supply than does the incandescent bulb type of flashlight disclosed by Stone. Nevertheless, the circuitry disclosed in Williams et al. for operating the xenon flashtube is expensive, bulky, and only suitable for intermittent operation of the flashtube rather than for providing a constant light output. Thus, the teachings of the prior art disclosed by Williams et al. is not suitable for remedying the inherent limitations of the incandescent bulb type flashlight technology disclosed by Stone.

As stated above, the fundamental limitations of prior art flashlights related to inherent limitations of incandescent bulb technology, and inherent limitations of electrical circuits for driving other light generating devices such as the xenon flashtube shown in Williams et al. Nevertheless, semiconductor technology contemporarily advanced so as to provide semiconductor devices, including light emitting diodes (hereinafter occasionally "LEDs") having significantly lower current drain than incandescent bulbs in a highly robust package operable at relatively low direct current voltages. In addition, early LEDs were substantially more power efficient than incandescent bulbs having similar current consumption characteristics. Finally, the small physical size of LEDs permitted extremely efficient packaging shapes to be adopted for such lights. U.S. Pat. No. 5,386,351 to Tabor discloses such a space efficient packaging design for a single LED flashlight. The Tabor patent discloses a two-part, snap-fit housing incorporating a discoid type battery in which one leg of a two terminal LED is employed as part of a cantilever spring switch mechanism which upon depression by a flexible button completes a direct current circuit to the LED. Unfortunately, such early stage LEDs could not provide significant light output without being driven at very high currents, in which case, the power efficiency of the LED with respect to the quantity of light produced significantly decreased. Also, LEDs in use during the period in which the Tabor patent application was filed were only capable of producing light in the red part of the visible spectrum. These two limitations resulted in an LED flashlight only having utility for intermittent operation or continuous illumination over short distances. Therefore, such personal flashlights could not supplant conventional incandescent bulb flashlights which have a more linear relationship with respect to supply voltage and current. A high intensity incandescent bulb flashlight can be produced by merely increasing the amount of current and/or voltage supply to the bulb. Conventional LEDs, being nonlinear devices do not respond in such a linear fashion. Therefore, LEDs were often employed in lighting devices for alternative purposes, such as the color coded, multiple LED light and key device shown in U.S. Pat. No. 4,831,504 to Nishizawa et al. The Nishizawa et al. patent discloses a combination LED flashlight and key in which multiple LEDs having different colors are driven by separate, manual switches and/or a microprocessor to signal an appropriate light detecting and demodulating device in association with a door lock or operating lock. Similarly, International Patent Application No. WO 01/77575 A1 titled, "Portable Illumination Device" published on Oct. 18, 2001, to Allen discloses a unique product package for a single LED personal flashlight employing a discoid type battery in which multiple depressions of a switch incorporated into the product housing cycles the single LED through multiple modes according to instructions stored in a microprocessor within the housing. Neither the invention disclosed by Nishizawa et al. nor the invention disclosed by Allen is capable of substantially increasing the light output of the LED such that the lighting devices disclosed therein are adequate replacements for high intensity incandescent bulb flashlights. The principle reason for this is that light emitting diodes, being junction semiconductor devices, have a forward bias voltage which is predetermined by the physics of the semiconductor materials from which diodes are manufactured. The forward biased voltage of silicon-based light emitting diodes is approximately 3.6 V for aqua, blue, and white LEDs and 1.8 V for red, yellow, and green LEDs. The voltage-current characteristics of devices of this type are such that substantially increasing the applied voltage outside of a range defined by the forward bias voltage does not substantially increase the light output of the device, but merely results in vastly increased current flowing therethrough. The power output of a diode being equivalent to the product of the voltage applied thereto and the current flowing therethrough, higher voltages on the power supply side merely result in much higher current which results in wasted power without significant additional illumination. Thus, the light emitting diode can basically be characterized as a device having an optimal operating characteristic defined by a substantially constant current at a nearly fixed voltage. Therefore, the only efficient method for substantially increasing light output of a prior art LED device based on the silicon architecture is to provide multiple LEDs in parallel with the direct current voltage supply. Unfortunately, this arrangement only drains the typical (1.2, 1.5 or 3 V) battery supplies quickly until the batteries can no longer supply the forward bias voltage of the diodes. Placing the LEDs in series with the power supply merely exacerbates this problem. Thus, although the direct current power supply may be capable of providing additional current (i.e., the batteries are not fully discharged yet) the potentially depleted batteries cannot forward bias and thus illuminate the LEDs.

The semiconductor industry has recently addressed the above limitations of LEDs by providing white light LEDs based on indium-gallium-arsenic-phosphide architecture having forward bias voltages in excess of 3.6V. LEDs of this type not only provide a white light which is more effective than the red light of the prior art doped silicon technology but also produced substantially more light output for a given current. Unfortunately, the battery technology based on a voltage of approximately 1.5V per dry cell is again limited in that three dry cells in series, having a nominal voltage of 4.5V, are quickly drained to an actual applied voltage of less than 3.6V at which point the white light LED becomes inoperative even though the batteries still retain a substantial charge.

Therefore, a need exists for an LED driver circuit which conditions all of the available power within the conventional dry cell battery for application to high voltage LEDs for personal lighting technology purposes.

BRIEF SUMMARY OF THE INVENTION

It is therefore an object of the present invention to provide a light emitting diode driving circuit which conditions the power available from conventional dry cell batteries for application to nonlinear, active lighting devices such as light emitting diodes.

It is a further object of the invention to achieve the above object in a circuit design occupying a small physical area for incorporation into an economical package.

It is yet another object of the invention to achieve the above objects in a circuit design which has a minimum of components and is therefore inexpensive to produce.

It is yet another object of the invention to achieve the above objects in a light emitting diode driving circuit operating under methodologies which mimic the characteristics of an incandescent bulb flashlight so as to provide a conventional user interface.

The invention achieves the above objects and advantages, and other objects and advantages to be described further hereinbelow, by providing a light emitting device driver circuit having means for accepting a direct current power supply having a nominal voltage, an active light emitting device having a forward bias voltage greater than the nominal voltage, and a boost converter circuit for increasing the voltage of the direct current power supply. A first switch selectively and electrically communicates an inductive element within the boost converter circuit to a ground so that the inductive element can alternately be charged by the power supply and discharged through the light emitting device. A control device is operatively coupled with the first switch for charging and discharging the inductive element. The control device also measures a time period associated with the discharge cycle of the inductive element during which a preselected voltage threshold is sensed by the control device. That time period is indicative of the ability of the power supply to charge the inductive element. The control device then adjusts a time period associated with a charge cycle of the inductive element through the first switch so as to deliver a substantially constant current to the light emitting device regardless of an actual voltage of the direct current power supply. As used herein, the term "light emitting device" relates to an active device such as a light emitting diode, transistor, or other nonlinear device having a forward bias voltage which must be applied to induce the device to provide illumination. In addition, the term refers to both a single device and/or an array of similar devices connected either in parallel or in series.

In a first preferred embodiment of the invention, the first switch is a semiconductor device such as a bipolar or field effect transistor having an inherent base or gate capacitance with respect to ground. The control device is preferably a multistate micro-controller having an internal resistance electrically coupleable with the base or gate capacitance so as to create a resistive-capacitive (RC) time constant associated with an off period of the first switch during which time the inductive element is discharging. The micro-controller preferably has general-purpose inputs/outputs which are capable of existing in three states: two output states (logical high or logical low); and one input state (floating), through a pull-up resister (which can be read for voltage). In this first preferred embodiment, at the end of a inductive element discharge cycle, when the current output of the induction element is essentially zero and the first transistor switch is in an open state, the micro-controller pin which is connected to the base or gate of the transistor is permitted to float as an input pin. Thus, the natural base or gate capacitance of the transistor is connected through an internal pull-up resistance of the micro-controller and the power supply voltage is applied thereto for a limited period of time so as to create an RC time constant. Preferably, this occurs within an off period of the first switch during which time the inductor is discharging. This time constant is a known quantity of the FET and internal pull-up resistor of the micro-controller. The voltage on this natural capacitor is measured by the microcontroller until a CMOS threshold of the micro-controller (typically 1.2V) is achieved. The duration of this time period (usually 30 to 70 $\mu$sec.) is indicative of strong to weak direct current power supply voltage. The micro-controller then, through the first switch, adjusts a duration of the inductive element charging cycle (if necessary) so as to store additional energy in the inductive element's magnetic field. In this preferred embodiment, when the inductive element is discharged (by turning off the transistor) the inductive element is permitted to discharge through a blocking diode of the boost converter circuit to one or more light emitting diodes connected in series and/or parallel across a smoothing capacitor. In this manner, a substantially constant current can be supplied to the light emitting diodes regardless of the actual instantaneous voltage of the direct current power supply and even if the nominal voltage of the direct current power supply is less than the forward bias voltage of the LED or LED array.

In an alternate embodiment of the invention, the ability of the direct current power supply to charge the inductive element is measured through a conventional voltage divider, rather than a resistive-apacitive circuit. In this manner, the same type of micro-controller device having CMOS logic levels can be used to monitor the inductive element's flyback period during discharge through the LED or LED array. As with the RC time constant method described above with respect to the first preferred embodiment, the amount of time the inductive element takes to discharge through its load is indicative of the amount of time necessary for the DC power supply to charge the inductor. By using a series voltage divider having individual resistive elements of appropriate ratio, a voltage drop across one of the resistive elements can be predisposed to fall within the CMOS logic level voltage for a variety of different DC power supplies having various nominal voltages. In this alternate embodiment, a second switch (also preferably a bipolar or field effect transistor) is under control of the micro-controller to connect the inductive element and voltage divider combination to a ground. The connection is intermittently made at various measurement times during the inductor element discharge cycle. Thus, the micro-controller is aware of the amount of time the fully charged inductor takes to reach the CMOS logic level during discharge, and hence the ability of the power supply to charge the inductive element. Again, the micro-controller appropriately adjusts the on period of the first switch which controls the amount of charging of the inductive element from the DC power supply. In this manner as well, a relatively constant current can be supplied through the boost converter circuit blocking diode to the LED or LED array.

By indirectly measuring the ability of the DC power supply to charge an inductive element, it is possible for the micro-controller of the preferred embodiments to measure a variety of other characteristics as well as control various parameters of the light emitting diode or light emitting diode array. In additional alternate embodiments, where a relatively high current passes through a few or only one light emitting diode element, the temperature of the light emitting element can be monitored by substituting a resistive element having a negative thermal coefficient for the internal pull-up resistor of the micro-controller itself. In this manner, the RC time constant related to the charge-up profile of the base/gate capacitance of the first switch transistor is variable depending on the temperature of the LED or LED array. Thus, the micro-controller can determine if an overheating condition exists so as to shut off current flow to the LED or LED array. In addition, certain white light LEDs are extremely bright if supplied with the full current which is available from the inductive element when charged by fresh batteries. Therefore, in another embodiment of the invention, the micro-controller can sample a rate at which the inductor is charged through the voltage divider technique discussed above. The micro-controller thus develops a profile of the DC power supply before the inductor ever reaches the full state of charge which the DC power supply is capable of providing. Once the profile has been determined, the maximum brightness of the LED or LED array can be limited by limiting the duration of the charge cycle such that the illumination from the LED or LED array will not be dangerously blinding. By thus ramping up the LED brightness when the light is first activated, the user can avoid the bright and possibly damaging blast of light if he were staring at the light when it was activated.

Finally, the micro-controller can cause the LED or LED array to mimic a conventional incandescent bulb flashlight "dimming out" when the ability of the DC power supply to charge the inductive element is sensed to be low. In one embodiment of the invention, if the micro-controller detects a reduced ability of the DC power supply to charge the inductor, the LED can be made to apparently dim and go out by varying a duty cycle of the first switch so as to supply a linearly decreasing current to the LED or LED array. In this manner, the user can readily recognize that batteries of the DC power supply need to be replaced because the light emitting diode or diode array appears to be dimming out as would a conventional incandescent bulb when the battery supply is nearly exhausted.

DETAILED DESCRIPTION OF THE INVENTION

Figure 1:
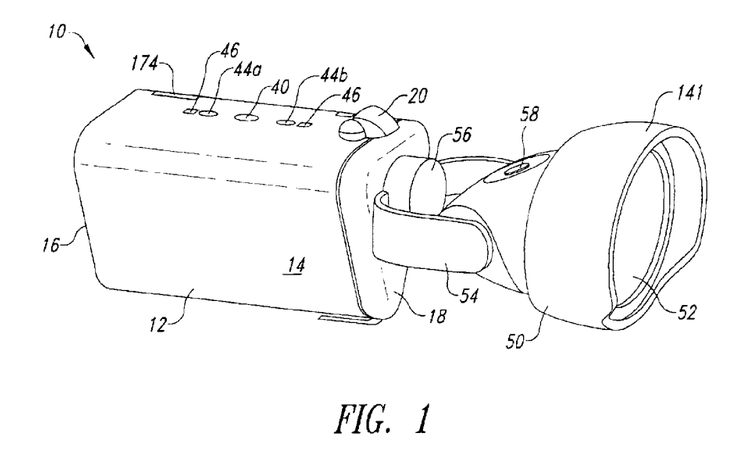
FIG. 1 is a perspective, environmental view of a convertible flashlight-headlamp employing the light emitting device driver circuit and method of the present invention.
Figure 2:
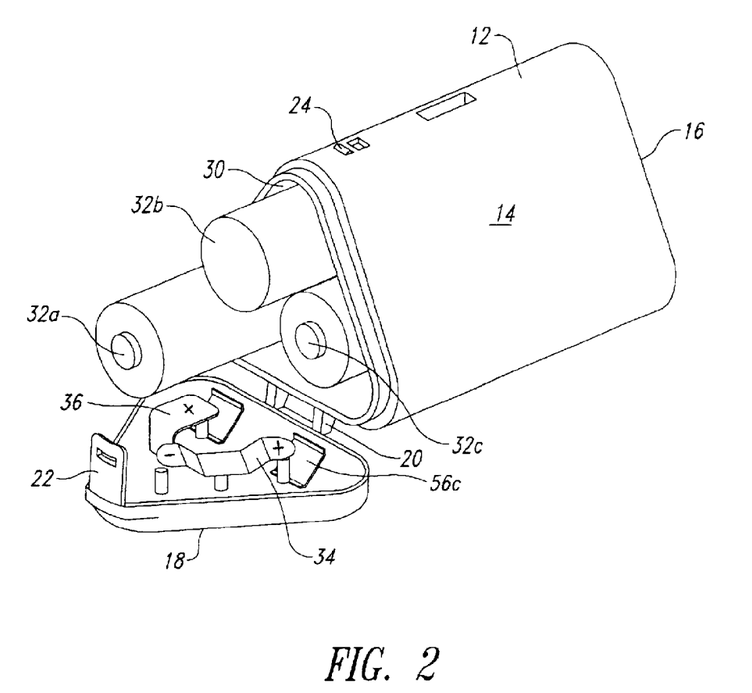
FIG. 2 is a perspective, environmental view of a battery case of the flashlight-headlamp illustrating an exemplary AA cell battery power supply.

A convertible flashlight-headlamp, employing a light emitting device driver circuit and method of the present invention, is generally indicated reference numeral 10 in FIG. 1. Mechanical characteristics of the convertible flashlight-headlamp are fully described in U.S. Patent Application entitled "CONVERTIBLE FLASHLIGHT-HEADLAMP" claiming priority from a provisional application of the same title filed on Nov. 16, 2001, Ser. No. 60/331,941 and assigned to the assignee of the instant application. The disclosure from that copending application is incorporated herein by reference. For purposes of this disclosure, it is sufficient to state that the convertible flashlight-headlamp 10 has a triangular battery compartment 12 having three sides 14, a fixed end cap 16, and an openable end cap 18 for allowing selective access to the battery compartment. As best seen in FIG. 2, the end cap 18 is pivotable about a hinge 20 and may be secured in a closed position by means of a flexible latch 22 engageable with a corresponding projection 24 on an apex of the side 14. The battery compartment 12 defines an interior cavity 30 adapted to receive three conventional AA batteries 32a, 32b, and 32c. Each battery has a nominal rating of 1.5V. The openable end cap 18 is provided with a plurality of electrical contacts 34 and 36 which in combination with corresponding electrical contacts (not shown) on the fixed end cap 16 within the interior cavity 30 connect the batteries in series so as to provide a DC power supply having a nominal 4.5V with fresh batteries.

As best seen in FIG. 1, the triangular battery compartment 12 is provided with a plurality of threaded receptacles 40, pairs of external electrical contacts 44, and pairs of aligned orienting tabs 46 for accepting a lamp assembly 50 for connection thereto. The lamp assembly has a plurality of LEDs (not seen in FIG. 1) behind a lens 52. The lamp assembly 50 is mechanically and electrically connected to the battery compartment 12 by an articulated yoke 54. The articulated yoke has internal electrical conduits for connection with the external electrical contacts 44, depressions for receipt of the orienting tabs 46 (each not shown), and a knurled screw 56 for physically mating the yoke with the threaded receptacle 40 on the battery compartment 12. As will be appreciated by those of ordinary skill in the art, the correspond structure is provided on the openable end cap 18 and/or fixed end cap 16 so that the lamp assembly 50 can be repositioned in any of three locations on the triangular battery compartment 12. The lamp assembly 50 is also provided with a multifunction pushbutton switch 58 for operating the LED array behind the lens 52 in a variety of different modes to be described further hereinbelow.

Figure 3:
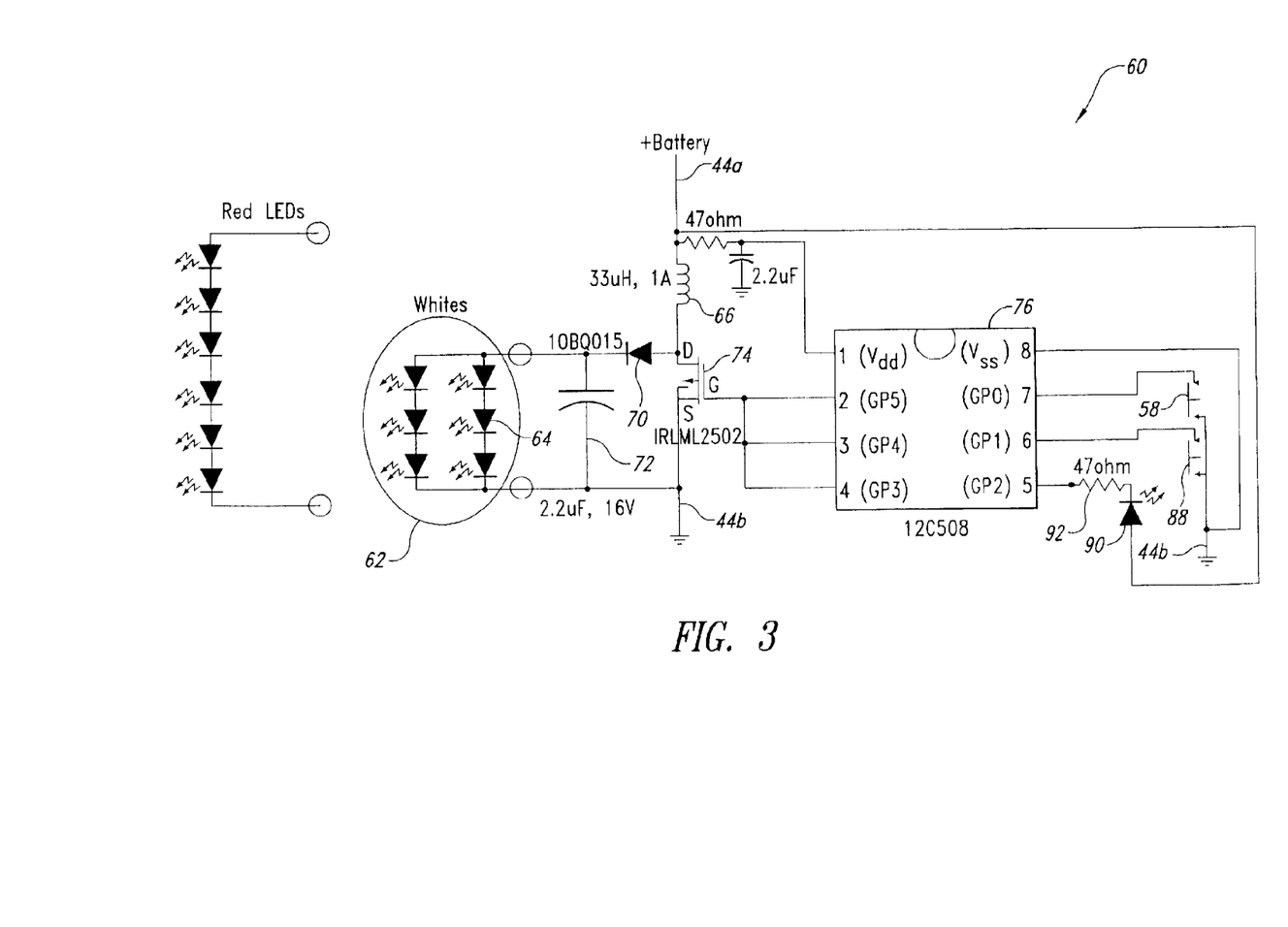
FIG. 3 is a schematic representation of a light emitting device driver circuit of a first embodiment of the invention.
Figure 5:
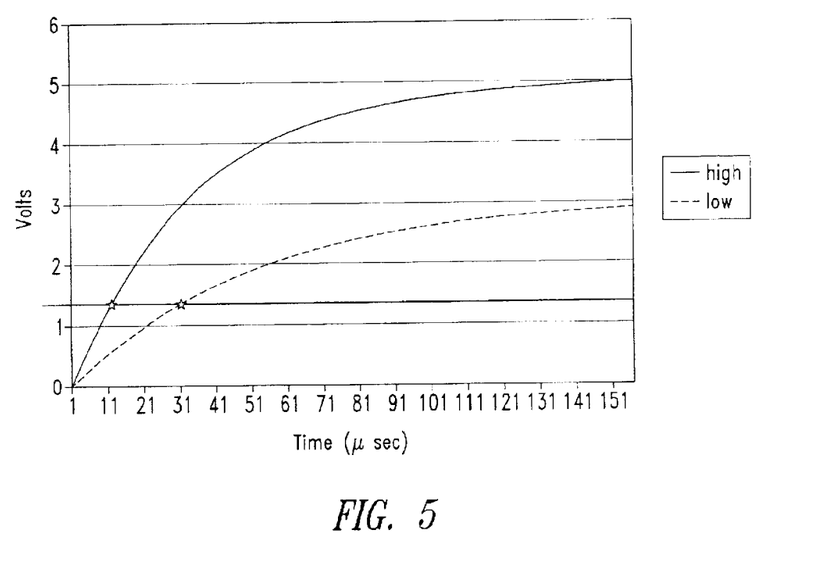
FIG. 5 is a graph illustrating two different charging profiles for an RC time constant of a base/gate capacitive resistive circuit associated with DC power supply strength.

A first embodiment of a light emitting device driver circuit is generally indicated at reference numeral 60 in FIG. 3. The circuit includes a light emitting diode array 62 consisting of a plurality of individual LEDs 64 connected three in series, and two series of three connected in parallel. The preferred light emitting diode is manufactured by Nichia having a white light output and a forward bias voltage of 3.6V per diode. Thus, the forward bias voltage ($V_{fb}$) of the LED array 62 is 10.4V. The power supply within the triangular battery compartment 12, however, can only supply at best its nominal voltage of 4.5V. Therefore, circuit 60 includes a conventional boost circuit consisting of a 33 $\mu$H inductor 66 rated at 1 A in series with a Schottky diode 70 having a 0.1V forward bias voltage in parallel with a 2.2 $\mu$F smoothing capacitor 72. The LED array 62 is in parallel with the smoothing capacitor in the conventional boost converter circuit configuration. A first switch 74, preferably in the form of a depletion mode, n-channel field effect transistor (hereinafter "FET") is provided to selectively connect the inductor 66 to ground so as to permit the power supply to charge the inductor when the gate of the FET is energized. The drain of the FET 74 is connected to an output of the inductor 66 and the anode of the diode 70. The source of the FET 74 is connected to the ground 44b. The high side of the inductor 66 is connected to the positive power supply 44a. The gate of the FET 74 is connected to pins 2, 3, and 4 of a logic control device 76 preferably in the form of an 8-bit programmable micro-controller manufactured by Microchip, Chandler, Ariz., USA. An appropriate model number PIC 12C508 has 8 pins numbered in the conventional manner. As stated above, the gate of the FET 74 is connected to pins 2, 3, and 4 of that micro-controller (general purpose pins 5, 4, and 3) in the preferred embodiment. Pin 1 is connected to the positive power supply 44a while pin 8 is connected to ground 44b. Pin 7 is connected through the multifunction switch 58 to ground. The general purpose pins (physical pins 2–7) of the micro-controller 76 are of the tristatable type, that is, these pins can be used as outputs (driven at CMOS logical high or low) or can be used as input pins which float like open circuits and can be intermittently connected through internal pull-up resistors to ground the supply voltage so that voltages can be measured at those pins. The invention advantageously employs the multistate characteristic of these pins to turn the FET switch 76 on and off so that the inductor 66 can be alternately charged and discharged, and at certain preselected periods during this charge/discharge cycle convert general purpose pins 5, 4, and 3 (physical pins 2, 3, and 4) to inputs for measuring voltage in an RC timing circuit comprising the natural gate capacitance of the FET switch 74 connected to battery voltage through an internal pull-up resistance of the micro-controller. It is well known to those of ordinary skill in the art that all field effect transistors (and the base of junction transistors as well) have an inherent capacitance with respect to ground. Gate capacitance is a known and fixed characteristic of the geometry and chemistry of the field effect transistor which is provided by the manufacturer. In addition, the internal resistance of the microcontroller is also known and supplied by the manufacturer. The micro-controller is also capable of sensing at its general purpose pins when a threshold voltage (typically the CMOS threshold voltage of 1.2V) is achieved at any of the general purpose pins when the pins are used as inputs. Thus, at an appropriate time the micro-controller 76 applies the power supply voltage through its internal resistance to the gate of the FET 74 and then measures the amount of time it takes for the gate capacitance to reach the threshold voltage. The gate capacitance and internal resistance being fixed, this time to threshold voltage is proportional to the ability of the power supply to charge the inductor. Shorter times represents strong batteries. Longer times represents weak batteries. In the preferred embodiment, a time period of 11 $\mu$sec represents strong batteries, whereas a measured time of 31 $\mu$sec represents weak batteries. Although the RC curve is exponential, the initial part of the curve below 1.2V is surprisingly linear such that the micro-controller 76 preferably increases the turn-on time of the FET by a proportionate amount to generate a larger magnetic field in the inductor 66 during a charge cycle. In this manner, a substantially constant current can be supplied for the LED array 62 regardless of the actual, instantaneous voltage of the battery supply available at external electrical contacts 44a and 44b. This is the case even whereas here in the preferred embodiment, the nominal battery voltage is significantly below the forward bias voltage of the LED array 62. In addition, the received transition time through the pre-selected threshold voltage of 1.2 volts is measured while the battery supply is under load and thus is a more accurate representation of the ability of the power supply to energize the inductor 66. FIG. 5 is a graph of voltage versus time for an RC curve of the gate capacitance/micro-controller internal resistance based on high battery power and low batter power illustrating the different transition times to threshold voltage as described above.

Figure 4:
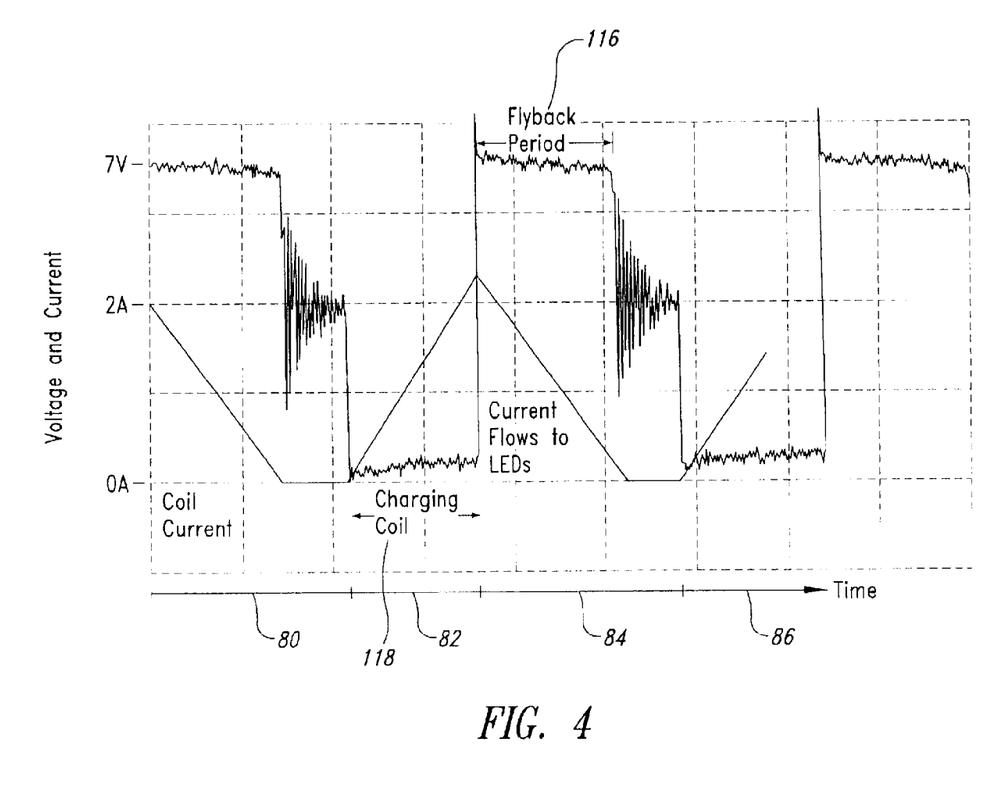
FIG. 4 is a graph illustrating an instantaneous voltage associated with an inductive element of the invention and current supplied by an inductive element of the invention.

FIG. 4 graphically represents both the voltage sampled at the drain of the FET first switch 74 and also the current supplied through the blocking diode 70 from the inductor 66. A first discharge cycle 80 is followed by a first charging cycle 82, a subsequent second discharge cycle 84 and a partial third charging cycle 86. In the first discharging cycle 80, the inductor 66 is supplying approximately 2 A through the blocking diode 70 to the smoothing capacitor 74 and LED array 62. The inductor current is represented by a substantially straight triangular and solid line having flat portions at the end of each discharge cycle 80, 84 representing zero current flow. The graph representing the current flow through the blocking diode 70 to the LED array 62 has a substantially constant slope because of the rate of change of the current supplied by the inductor with respect to time is proportional to the input voltage (a constant because the battery supplies direct current) provided by the inductance. The inductor voltage (represented by the wavy line in the graph) is substantially more complex because the inductor will supply any voltage necessary to maintain the instantaneous current flow. Thus, as seen in FIG. 4 during the initial discharge cycle 80, the voltage available at the base of the inductor (connected to the drain of the FET first switch 74) remains fairly constant until the current supplied by the inductor drops to approximately zero. At that time, the inductor "rings" about the battery supply voltage (approximately one-half of the previous voltage on the inductor) until the micro-controller 76 turns the first switch FET 74 on which begins charging the inductor during the first charge cycle 82. The inductor voltage remains substantially at zero while the current supplied by the inductor increases linearly to a maximum current of approximately 2 A limited by the length of time which the micro-controller 76 permits the FET first switch 74 to be on. At the end of the first charge cycle 82, the first switch field effect transistor 74 is turned off (the FET switch opens) permitting the inductor 66 to discharge through the blocking diode 70 to the LED array 62. The inductor voltage at the drain of FET 74 instantaneously jumps to an extremely high value and then remains substantially constant at about 7 volts during what is commonly termed a "flyback period" during second discharge cycle 84. During this so-called "flyback period" the inductor voltage remains substantially constant while the current supply by the inductor linearly decreased towards zero. As the inductor current approaches zero the inductor 66 again begins to "ring" about the battery supply voltage with the amplitude of each excursion exponentially decreasing. During this period of time the inductor current supplied through the blocking diode 70 is again zero until the FET first switch 74 is again turned on by the micro-controller 76 during the third charging cycle 86.

It is to be understood that although the voltage supplied by the inductor 66 through the blocking diode 70 is essentially a triangular wave having periods during which no current is being supplied. The current supplied to the LED array 62 is substantially constant due to the effect of the smoothing capacitor 72 and blocking diode 70. That is, during a discharge cycle, the capacitor 7 is charged to at least the forward bias voltage of the diode array 62 regardless of the actual battery voltage since the inductor is capable of supplying any voltage necessary to maintain the instantaneous current flow through the blocking diode. That is, the capacitor 72 during any period of time in which the voltage supplied by the inductor 66 is less than the forward bias voltage of the diode array 62 will itself supply current to the diode array. In this preferred embodiment, with the component values given, the LED array 62 is in fact supplied with a substantially constant current of approximately 140 mA. (Approximately 70 mA per series sequence of LEDs). This is very close to an optimal supply of approximately 4 volts at 80 mA for each LED. The LEDs of this preferred embodiment will dim if supplied with voltage less than approximately 3.6 volts and will not operate at maximum efficiency provided with substantially less than 80 mA per LED.

The graph of FIG. 4 covers a time period of approximately 50 microseconds. Thus, the periods in which the inductor 66 is not supplying any substantial current to the LED array 62 is approximately 5 microseconds. It is during these time periods (and once every approximately 3,000 microseconds approximately 4% of an entire timing sequence) at which time general purpose pins 3, 4, and 5 of the micro-controller 76 are switched to a measuring input state and battery voltage is applied through the internal pull-up resistor to the gate of the FET first switch 74 such that the gate capacitor charging time can be measured. The micro-controller 76 then moderates the charging time of the inductor (the first charging cycle 82) from approximately 4 to 9 microseconds such that the desired current is on average supplied to the LED array 62.

The first preferred embodiment of the light emitting device driver circuit 60 is also preferably provided with a second control button 88 inter-connecting pin 6 (general purpose pin 1) of the micro-controller 76 to ground 44B. Upon depression of the second control button, micro-controller 76 supplies maximum power to the LED array 62 regardless of the state established by multi-function switch 58. Finally, a single red LED 90 may be connected to general purpose pin 2 (physical pin 5) of the micro-controller 76 through a current limiting resistor 92 such that when the power supply voltage falls below a pre-determined level only the red LED 90 will illuminate so as to provide emergency lighting for the user.

Figure 6:
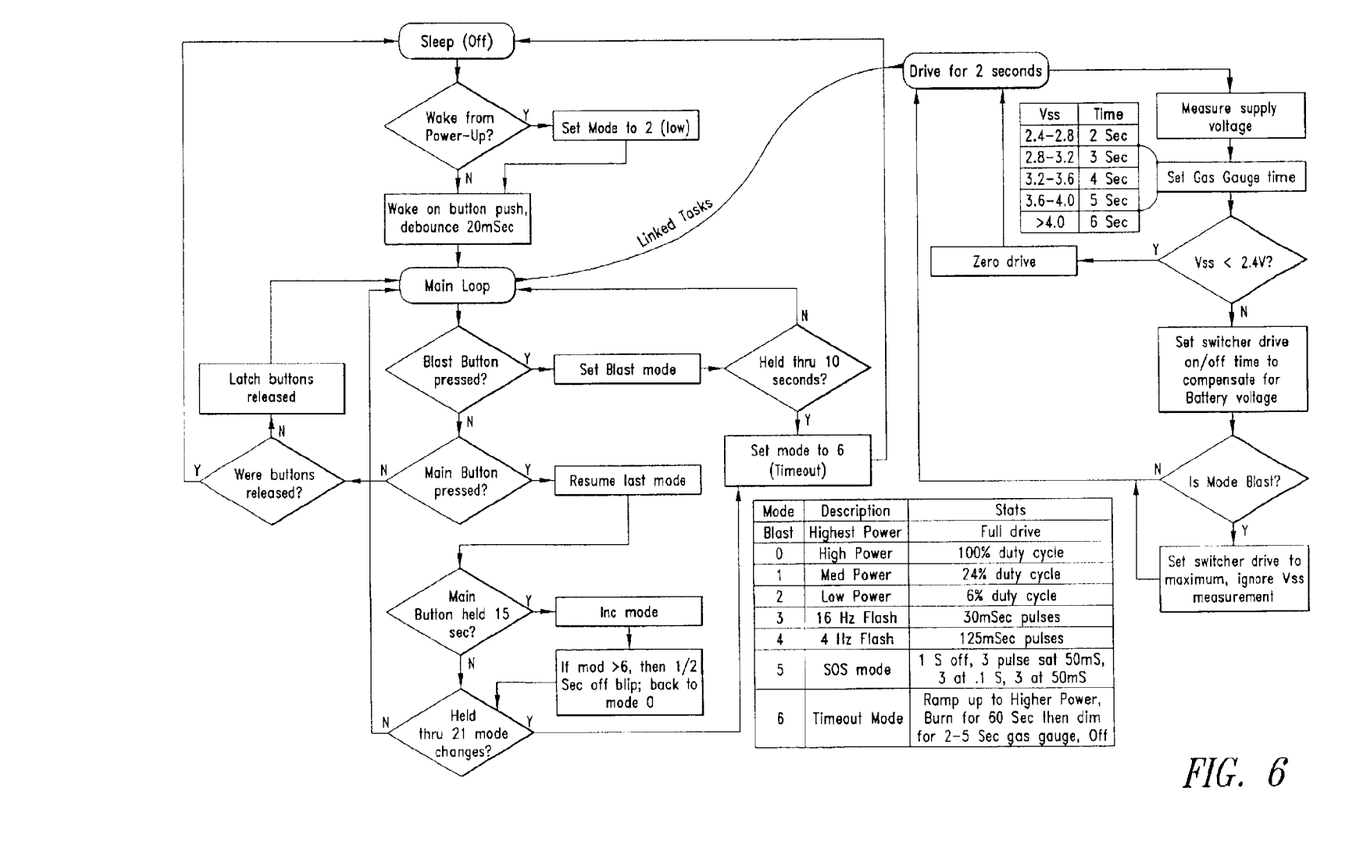
FIG. 6 is a flowchart illustrating a multistate logic diagram for a first embodiment of the invention including a power supply power measure display method of the invention.

The above method and apparatus of the first preferred embodiment incorporates a variety of advantages. In the first instance, what is actually being measured by the micro-controller 76 is the ability of the power supply to charge a resistive-capacitive load, which is closely related to the ability of that same power to supply to charge an inductor. Thus, sufficient energy is being pumped into the magnetic field of the inductor to supply the necessary current regardless of the actual voltage of the power supply or any alternate measurement of instantaneous nominal battery supply voltage. Secondly, there is no need for additional circuitry such as analog to digital converters, etc. which not only rob the batteries of power but take a significant amount of time to make their readings. In addition, the number of components is small and their cost is low such that the circuit is amenable to small packaging and inexpensive production. Finally, micro-controller 76 can be programmed to provide a variety of different modes of operation of the LED array 62 as well as to provide information to the user regarding the condition of the battery power supply in the battery compartment 12. FIG. 6 illustrates a logical diagram for a variety of modes which the user may initiate by depressing the multi-function switch 58 multiple times by varying the duty cycle of the first switch 74. In this manner, the LED array 62 may be illuminated with high, medium, or low power, as well as two different flashing modes at different rates. An SOS mode can also be achieved. Finally, the right side of FIG. 6 illustrates that the measured charge up time of the RC time constant established by the base/gate capacitance and internal pull-up resistance of the micro-controller 76 can be associated with a supply voltage. Under one method of the preferred embodiment, the measurement of the supply voltage is associated with an on time for the LED array at the end of a high power illumination cycle (60 seconds) followed by a dimming through medium and low power wherein the low power setting is maintained in a range of from 2 to 6 seconds until the LED array 62 is finally extinguished. The final dim period of 2 seconds represents low battery power, and a final dim period of 6 seconds representing high battery power. In this manner, the user is apprised of the condition of the power supply.

Figure 7:
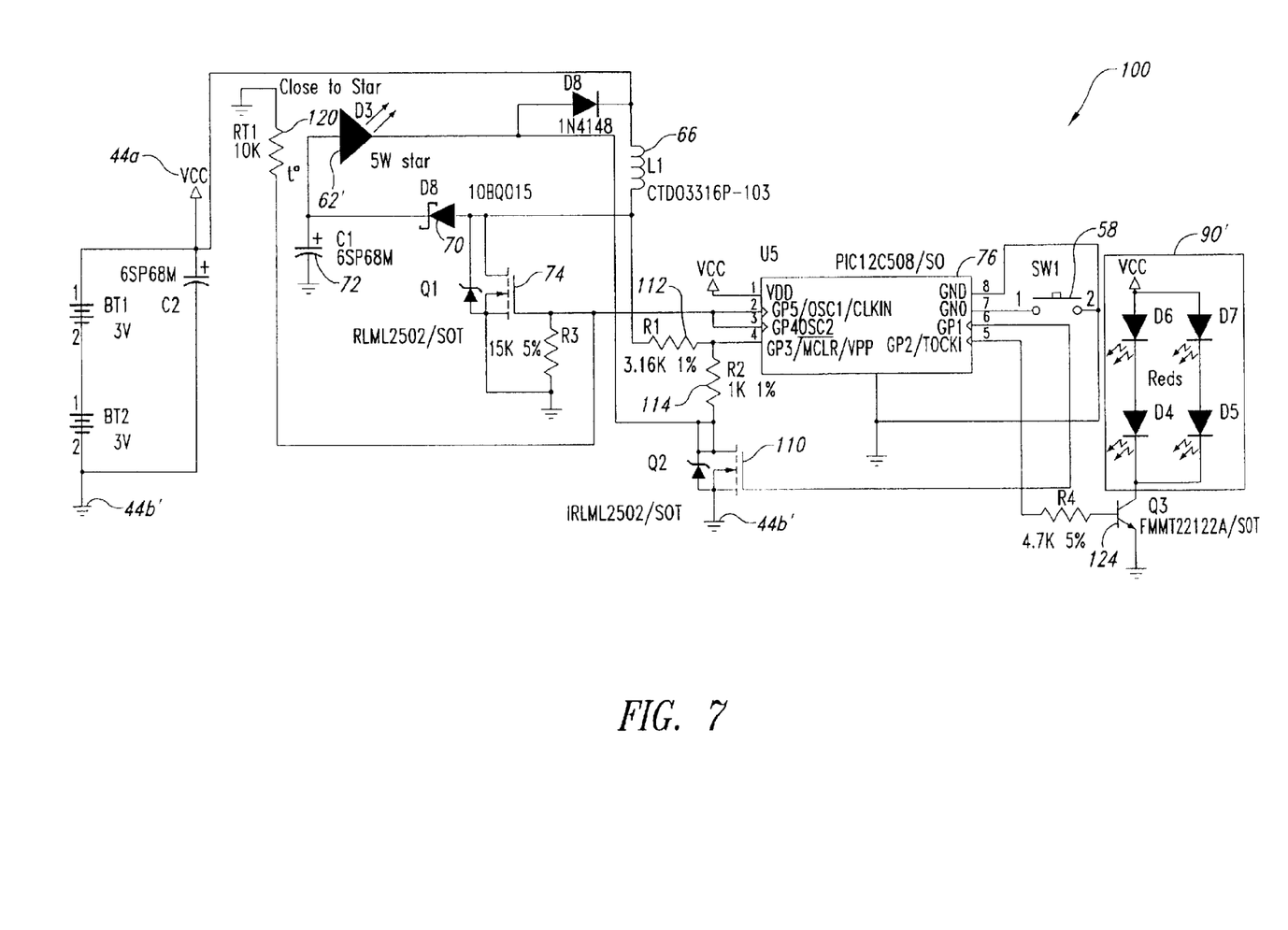
FIG. 7 is a schematic representation of a light emitting device driver circuit of a second embodiment of the invention.

A second embodiment of the invention is generally indicated at reference numeral 100 and is illustrated in FIG. 7. In this embodiment, the essential characteristics of the graph shown in FIG. 4 are used differently to determine the ability of the power supply (available at external electrical contacts 44A and 44B) to charge the inductor 66. In this alternate embodiment, the light emitting device driver circuit 100 has been modified so that the circuitry is easily adaptable to a variety of different power supplies and/or light emitting devices. In this embodiment the diode array 62 has been replaced with a single, very bright white light emitting diode 62' having an approximate 5 watt output at 6.5 volts forward bias and 700 mA. The power supply available at terminals 44A' and 44B' consists of two 3 volt lithium batteries having a nominal power supply of approximately 6 volts. An appropriate gallium arsenide LED 66' is available from Lumileds, San Jose, Calif., U.S.A. under the brand name Luxeon Star. In this second embodiment, the 6 volt nominal voltage of the power supply is very close to the 6.5 forward bias voltage of the diode 62'. As there is no conventional "off" switch in either of the preferred embodiments, it is important to carefully control both the voltage applied by the batteries to the circuit and to provide a means external to the micro-controller 76 and gate capacitance of the FET switch 74 for presenting the pre-selected threshold voltage to the micro-controller 76. In this second embodiment, a second switch 110 in the form a field effect transistor and a voltage divider consisting of first and second resistors 112, 114 are positioned in series between the inductor 66 and the ground 44B'. The second switch is preferably a field effect transistor having its gate controlled by general pin 1 (physical pin 6) of the micro-controller 76. This second switch serves to block all current flow in the off state, without which the LED would still light weekly at 6 V and the light could not be turned completely off. Thus, it is a boost-blocking circuit. Rather than measuring the voltage on the gate capacitance of the first switch 74, during the period of essentially no current flow from the inductor as with respect to the first embodiment, the micro-controller 76 now measures the actual flyback period indicated at reference numeral 116 in FIG. 4. The first and second resistors 112, 114 of the voltage divider are used to drop the voltage appearing at the bottom of the inductor 66 to approximately the threshold voltage level (approximately 1.2 volts) of the CMOS circuitry of the micro-controller 76 at general purpose pin 3 (physical pin 4). As with the first embodiment, general purpose pin 3 is directed by the micro-controller 76 to merely sense the voltage across the second resistor 114 when the FET of the second switch 110 is turned on to sample the divided inductor 66 voltage. A measurement of this flyback period is made approximately once every 8 charge/discharge cycles 80/82. The voltage across the second resistor 114 will cross the approximate 1.2 volt threshold level sensed by the micro-controller 76 at the end of a flyback period when the inductor begins to "ring" about the supply voltage. In the second embodiment shown in FIG. 7 with the selected component values, a ratio of resistance between the first and second resistors 112, 114 of approximately 3 to 1 will drop the battery supply voltage (i.e., the average inductor 66 ringing voltage) below the pre-selected voltage threshold. A typical flyback period for the selected component values will be approximately 10 microseconds. This indicates a strong power supply. For every microsecond of variation in the flyback period from this typical value, the inductor charging period 118 is incremented or decremented by 1 microsecond so as to maintain a substantially constant current flow to the LED 62'.

As will be apparent to those of ordinary skill in the art, if the nominal battery supply voltage is substantially changed from 6 volts as shown in the second embodiment 100 the ratio of the first resistor 112 to the second resistor 114 can be appropriately changed so that the battery supply voltage through the inductor is dropped by the appropriate amount below the CMOS threshold value which can be sensed by the micro-controller 76 when sampled through the second FET 110. Thus, no change with respect to the micro-controller 76 programming is necessary.

Use of the light emitting diode 62' introduces additional concerns which must be addressed for safety reasons. Principally, when the LED 62' is operating at full power (ie., 5 watts) the LED becomes very hot. If left in an insulated environment (e.g., a garment pocket) the LED 62' will self destruct at a temperature of approximately 150° C. and pose a fire hazard (normal operating temperature of the LED 62' is approximately 50° C.–70° C.). In order to monitor the temperature of LED 62' a thermistor 120 is placed in close physical proximity to the LED 62' and is connected between ground and the gate of the first FET switch 74 in parallel with the internal resistance of the micro-controller 76. Thus, the RC time constant apparent at the gate of the first FET switch 76 is now variable and dependent upon the negative temperature coefficient of the thermistor 120. That is, as the thermistor becomes heated by the LED 62' the RC time constant measured by the micro-controller 76 changes. In this manner, general purpose pins 5 and 4 of the micro-controller 76 (physical pins 2 and 3) are intermittently sampled in a fashion similar to that explained with respect to the first embodiment 60 such that the pins are driven in one of the tri-states to apply the supply voltage to the gate of the first FET switch 74 to charge up the gate capacitance. The pins are then turned off and switched to input mode allowing the gate capacitance to discharge through the thermistor. The micro-controller 76 now measures the time it takes for the voltage across the thermistor 120 to drop below the CMOS threshold of 1.2 volts. If the time period is small (i.e., too fast) the thermistor (and hence the LED 62') is hot. The micro-controller 76 then turns off the second and first switch 110, 74 preventing current flow through the LED 62'. Additional safety factors taken into consideration include the extremely high intensity of the LED 62' which can be blinding if focused in the eyes of a user if the power supply is at full capacity. To eliminate this possibility, in this second embodiment the micro-controller 76 supplies current to the diode 62' with a slow ramp. The 8-bit counter of the micro-controller 76 produces 256 charge and discharge cycles which are repeated. In this ramp-up mode, the LED 62' is only initially illuminated for one cycle of the first 256 cycles. Thereafter the LED 62' is illuminated for 2 cycles, 3 cycles, etc. of each 256-cycle period. During each of these initial discharge cycles, the flyback period is measured as described above to provide an indication of power supply strength. If the power supply is not powerful enough, then the maximum current drawn and supplied to the LEDs is limited so as not to overdraw the supply and collapse its voltage, causing erratic system resets.

Figure 8:
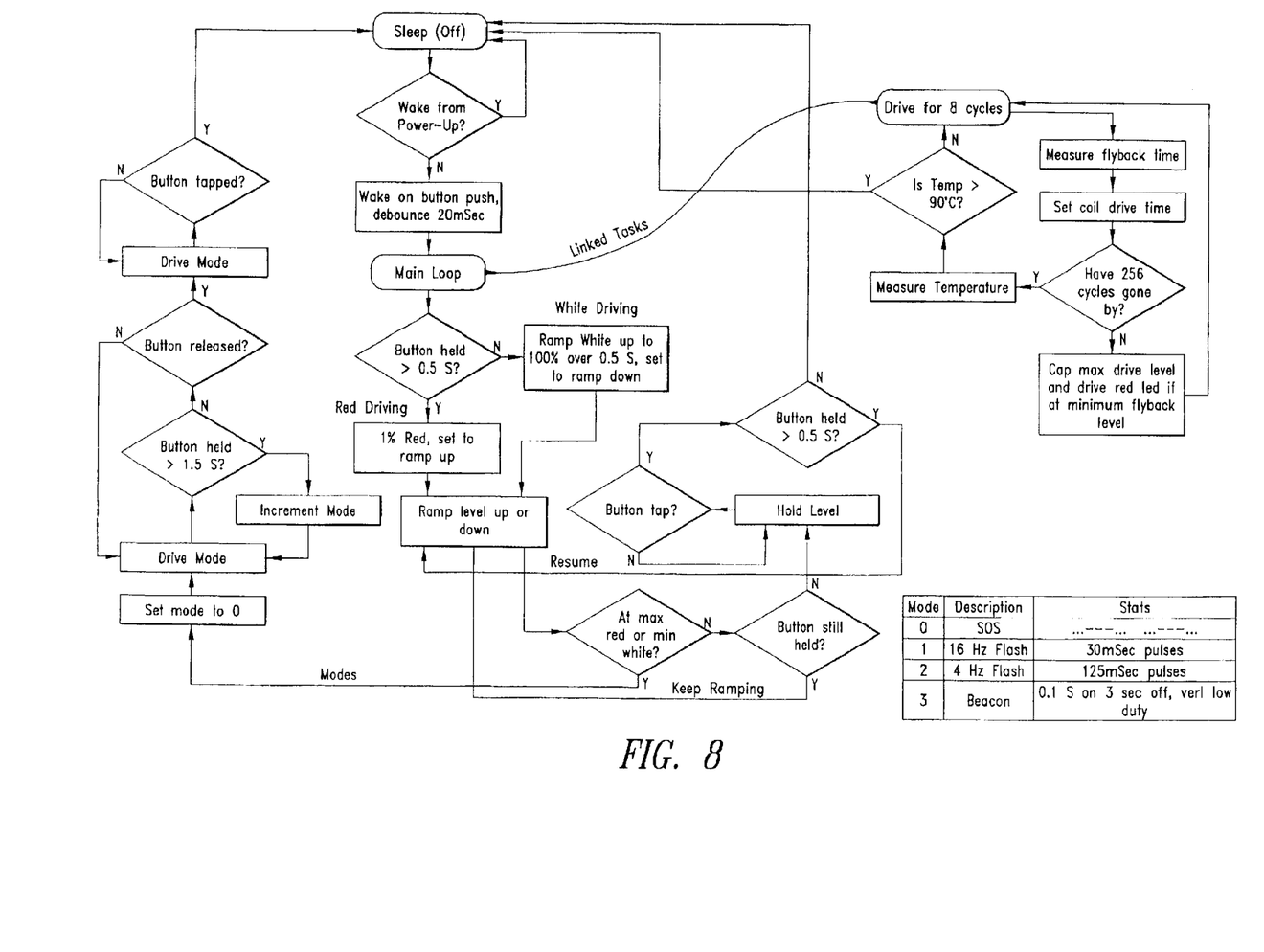
FIG. 8 is a schematic representation of an over-temperature measurement method of a second embodiment of the invention

Other variations are contemplated and implemented in the second embodiment 100. A modified emergency red LED array 90' is energized through a conventional bipolar junction transistor 124 having a base operated by general purpose pin 2 (physical pin 5) of the micro-controller 76 when low battery supply power is detected by the micro-controller. FIG. 8 illustrates the method steps employed by the second embodiment 100 both for measuring the temperature of the LED 62' and for driving the red LED 90' based on the minimum flyback time and thermistor 120 temperature.

Both the first embodiment 60 and second embodiment 100 of the light emitting driving circuit provide a number of advantages. As stated above, LEDs are constant voltage devices that require specific current for optimal operation. Conventional switching regulators available today are based on voltage regulators and do not regulate current directly. Rather, conventional switching regulators require a resistor added-in series with the LEDs which then sense the voltage on this resistor. The mathematical relationship between voltage, current, and resistance (Ohm's law) allows a voltage regulator chip indirectly establish current. Nevertheless, the resistor dissipates power as heat which could otherwise be used by the LEDs to generate light. In both the first and second embodiments, a micro-controller current base switcher turns on a first switch (preferably an FET) and allows a magnetic field to build in an inductor. The controller then shuts off the field effect transistor and captures the current available from the inductor through a Schotsky diode to the LED array through flyback. The micro-controller then either measures an inherent property of the loaded circuit (either an RC time constant associated with the FET, or the flyback period for the inductor) and adjusts the inductor charging time accordingly. Advantageously, the charged inductor will generate whatever voltage is needed to maintain its instantaneous current flow. The micro-controller can measure that time period (either RC or LR) because the voltage supplied by the inductor is higher while flying back after the inductor has dissipated its current in a characteristic voltage displayed when the inductor is ringing about the supply voltage. The micro-controller is essentially measuring time which is very simple for a micro-controller to do and wastes no energy as with other management techniques.

If the flyback period is too short, the charging FET (the first switch 74) is left on longer to charge the inductor more. Ultimately, the current through the LED array 62 or LED 62' is controlled. This current is a simple triangular function and the duty cycle of the first switch is known. This is directly related mathematically to the average current delivered. By way of example, if two-thirds of a charge/discharge cycle was used to charge the inductor (and measure conductor voltage) and one-third of the cycle was discharging (i.e., flying-back) then the average current is one-third of this triangular current pulse. At 3 A peak current, 1.5 A are averaged over the flyback period and 0.5 A overall were delivered to the LEDs by the smoothing capacitor 72. Thus, supply battery voltage is never directly measured which in fact is somewhat of a meaningless determination. However, the invention measures the ability of the battery supply to energize the inductor which is an amalgamation of both the battery supply voltage and internal resistance. This is indeed the critical parameter for determining the battery supply's ability to change the inductor and thus deliver current which is the ultimate requirement with a non-linear device such as a light emitting diode.

Those of ordinary skill in the art will conceive of other embodiments and variations of the invention in addition to those disclosed above. Thus, the invention is not to be limited by the above disclosure but is to be determined in scope by the claims which follow.

What is claimed is:

1. A light emitting device driver circuit, comprising:

power supply means for accepting a direct current from a power supply having a nominal voltage;

an active light emitting device having a forward bias voltage greater than the nominal voltage;

a boost converter circuit having an inductor, a charge storage element and a unidirectional current blocking element interconnecting the power supply and the light emitting device;

a first switch for selectively electrically communicating the inductor to a ground so that the inductor can alternately be charged by the power supply and discharged though the light emitting device; and, control means operatively coupled with the first switch for charging and discharging the inductor and for measuring a time period associated with a discharge cycle of the inductor during which a preselected voltage threshold, indicative of an ability of the power supply to charge the inductor is attained such that a charging cycle duration of the inductor is adjusted through the first switch by the control means so as to deliver substantially constant current to the light emitting device regardless of an actual voltage of the power supply.

2. The light emitting device driver circuit of claim 1 wherein the first switch is a semiconductor device having a gate/base capacitance and wherein the control means is a multistate micro-controller having an internal resistance electrically coupled with the gate/base capacitance so as to create an RC time constant associated with an off period of the first switch during which time the inductor is discharging.

3. The light emitting device driver circuit of claim 2 wherein the semiconductor device is an n-channel, depletion mode field effect transistor and the threshold voltage is approximately 2.4 Volts.

4. The light emitting device driver circuit of claim 1, including a voltage divider having first and second resistive elements electrically connected in series with the inductor and a second switch, operatively connected with the control means for selectively connecting the voltage divider to ground, wherein a junction between the first and second resistive elements is also electrically connected to the control means such that the control means can sample an instantaneous voltage supplied by the inductor during discharge though the voltage divider for comparison to the preselected voltage threshold when the first switch is off and the second switch is on.

5. The light emitting device driver circuit of claim 4 wherein values of the first and second resistive elements of the voltage divider are selected such have a ratio of approximately 3:1.

6. The light emitting device driver circuit of claim 1 wherein the active light emitting device is a light emitting diode.

7. The light emitting device driver circuit of claim 6 wherein the unidirectional current blocking element is a Schottky diode.

8. The light emitting device driver circuit of claim 1 wherein the first switch is a semiconductor device having a gate/base capacitance and wherein the control means is a multistate micro-controller having a multistate, general purpose input/output electrically coupled with the with the gate/base capacitance including a negatively thermally sensitive resistor interconnecting the gate/base to ground so as to create a variable RC time constant associated with an off period of the first switch during which time the inductor is discharging, the negatively thermally sensitive resistor being physically located adjacent to the light emitting device such that an overheating condition of the light emitting device is detected by the control means as an excessively long discharge time for the variable RC time constant.

9. The light emitting device driver circuit of claim 8, including a voltage divider having first and second resistive elements electrically connected in series with the inductor and a second switch operatively connected with the control means for selectively connecting the voltage divider to ground, wherein a junction between the first and second resistive elements is also electrically connected to the control means such that the control means can sample an instantaneous voltage supplied by the inductor during discharge though the voltage divider for comparison to the preselected voltage threshold when the first switch is off and the second switch is on.

10. The light emitting device driver circuit of claim 9 wherein the first and second switches are n-channel, depletion mode field effect transistors and the threshold voltage is approximately 2.4 Volts.

11. A method for driving a light emitting diode, comprising the steps of:
    closing a first switch so as to connect an inductor and a direct current power supply having a nominal voltage less than a forward bias voltage of a light emitting diode to be driven to ground so as to charge the inductor;
    opening the first switch so as to direct current from the inductor though a blocking diode to the light emitting diode and a smoothing capacitor;
    measuring a time period in which the inductor discharges to a pre-determined voltage threshold indicative of an ability of the power supply to charge the inductor; and,
    adjusting a closed time of the first switch so as to provide substantially constant current to the light emitting diode regardless of an actual voltage of the power supply.

12. The method of claim 11 wherein the first switch is a transistor having a gate/base capacitance and the measuring step is performed by a micro-controller having at least one multi-state input/output connected to the gate/base of the transistor and wherein the micro-controller measures a time period associated with a discharge of the capacitance through an internal resistance of the micro-controller until a pre-determined threshold voltage is attained.

13. The method of claim 11 wherein the threshold voltage is measured by a control device through a voltage divider selectively connecting the inductor to a ground thought the first switch.

14. The method of claim 11 wherein the first switch is a transistor having a gate/base capacitance and the measuring step is performed by a micro-controller having at least one multi-state input/output connected to the gate/base of the transistor and wherein the micro-controller measures a time period associated with a discharge of the capacitance through an internal resistance of the micro-controller until a pre-determined threshold voltage is attained including the step of measuring a heat output of the light emitting device with a negative thermal coefficient thermistor connected between the gate/base of the transistor so as to create a variable RC time constant associated with an off period of the first switch during which time the inductor is discharging, the negatively thermally sensitive resistor being physically located adjacent to the light emitting device such that an overheating condition of the light emitting device is detected by the micro-controller as an excessively long discharge time for the variable RC time constant.

15. The method of claim 11, including the step of limiting a maximum brightness of the light emitting diode by taking an initial measurement of an initial discharge cycle of the inductor as an indication of a charge rate of the inductor by the power supply and proportionately limiting an on time of the first switch in subsequent charge cycles of the inductor.

16. The method of claim 11, including the step of reducing an apparent brightness of the light emitting diode by reducing a duty cycle of the first switch in accordance with a measured power supply inductor charging ability so as imitate a dimming out characteristic of a conventional incandescent bulb flashlight operating under low battery power.

* * * * *